United States Patent [19]

Droulon et al.

[11] Patent Number: 5,277,672
[45] Date of Patent: Jan. 11, 1994

[54] CLEARANCE TAKE UP DEVICE FOR SO-CALLED CONTINUOUS EPICYCLOIDAL TRAIN ARTICULATIONS, AND ITS MOUNTING MODE

[75] Inventors: Georges Droulon; Yann Reubeuze, both of Orne, France

[73] Assignee: Ets. Cousin Freres, Flers, France

[21] Appl. No.: 927,549

[22] Filed: Aug. 6, 1992

Related U.S. Application Data

[63] Continuation of Ser. No. 546,408, Jun. 29, 1990, abandoned.

[30] Foreign Application Priority Data

Jun. 30, 1989 [FR] France ............... 89 08812
Dec. 22, 1989 [FR] France ............... 89 17113

[51] Int. Cl.⁵ ........................... B60N 2/02; F16H 1/32; F16H 3/70
[52] U.S. Cl. ........................... 475/176; 475/162; 475/170; 475/177; 297/362
[58] Field of Search ............... 475/162, 170, 172, 176, 475/177; 297/362, 348

[56] References Cited

U.S. PATENT DOCUMENTS

| | | | |
|---|---|---|---|
| 2,285,910 | 6/1942 | De Buigne | 475/172 X |
| 4,187,579 | 2/1980 | Gensicke | 297/362 X |
| 4,371,207 | 2/1983 | Wilking et al. | 475/162 X |
| 4,407,544 | 10/1983 | Bähring | 297/362 |
| 4,538,855 | 9/1985 | Peetz et al. | 297/362 |
| 4,634,181 | 1/1987 | Pipon | 297/362 |
| 4,715,656 | 12/1987 | Walk et al. | 475/162 X |
| 4,781,416 | 11/1988 | Johnson et al. | 297/362 |
| 4,786,110 | 11/1988 | Mahling et al. | 297/362 |
| 4,884,844 | 12/1989 | Kershaw et al. | 475/162 X |
| 4,887,863 | 12/1989 | Caillol | 297/362 |
| 4,895,038 | 1/1990 | Pipon et al. | 297/362 X |
| 5,096,261 | 3/1992 | Baloche | 297/362 |
| 5,154,475 | 10/1992 | Kafitz | 475/175 X |

*Primary Examiner*—Leslie A. Braun
*Assistant Examiner*—David E. Henn
*Attorney, Agent, or Firm*—Robert W. Becker & Associates

[57] ABSTRACT

The fixed flange with an inner toothing and the mobile flange with an inner toothing cooperate with a double satellite mounted in a ball bearing forming inside a housing for a composite cam. A sufficient excentration is provided between the diameter of the toothings of the double satellite and the intermediate part concentrical to the toothings of the fixed and mobile flanges so as to allow the composite cam made of two symmetrical and identical parts normally separated from one another at their upper portion by a spring which is slightly under tension and at their lower portion by a finger rigidly connected to an intermediate circular part mounted in bearing in the mobile and fixed flanges.

4 Claims, 6 Drawing Sheets

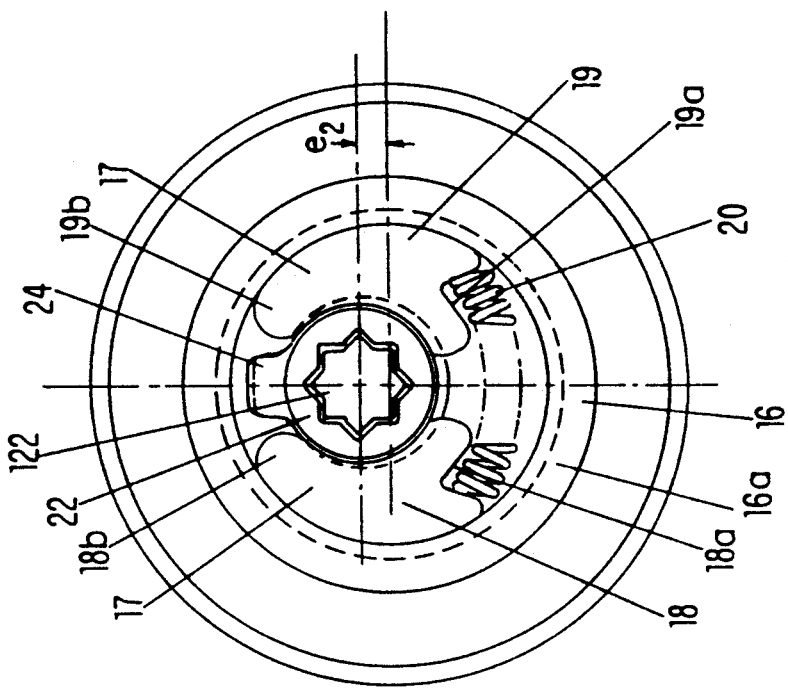
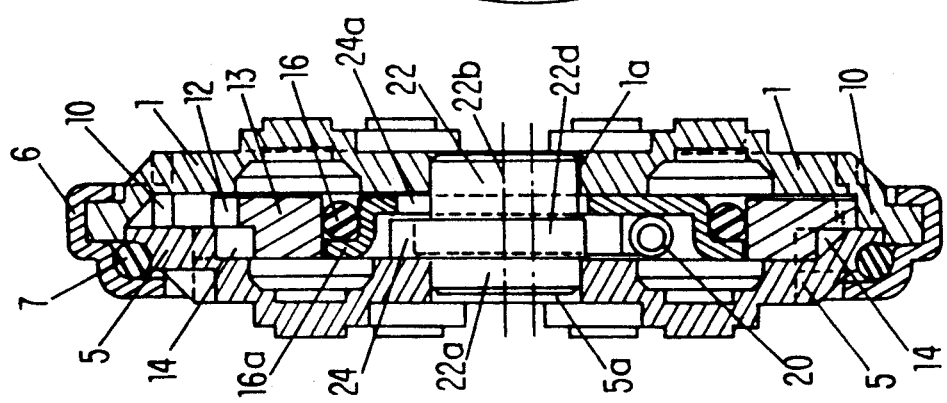
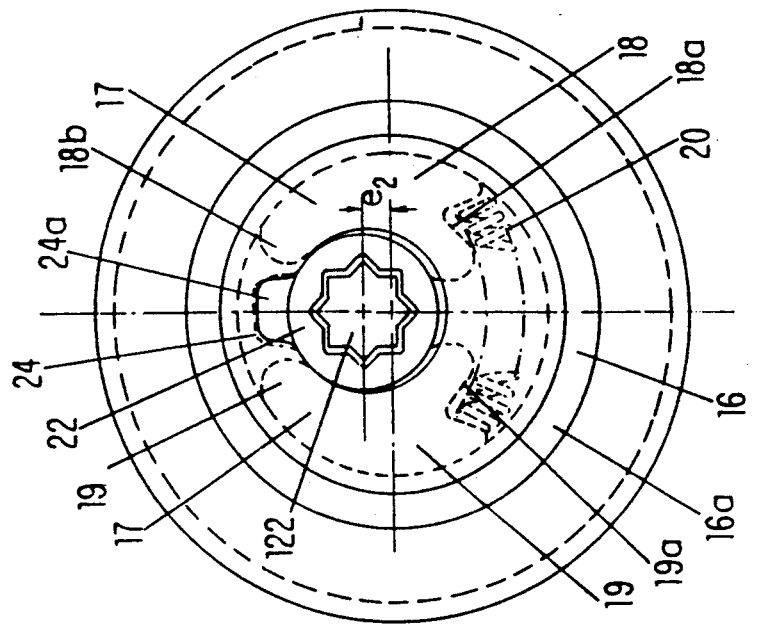

CLEARANCE TAKE UP DEVICE FOR SO-CALLED CONTINUOUS EPICYCLOIDAL TRAIN ARTICULATIONS, AND ITS MOUNTING MODE

This application is a continuation of application Ser. No. 546,408 filed Jun. 29, 1990 now abandoned.

FIELD OF THE INVENTION

So-called continuous epicycloidal train articulations are more and more used for the positioning of a vehicle seat portion of the seat since the adjustment of the seat is then perfect and very simple.

Unfortunately, the practical realization of such articulations requires manufacturing tolerances which, is spite of the care taken, will cause a certain play or clearance which is transmitted in a disagreeable manner either to the back portion or to the seating portion of the seat in consideration. These articulations are, therefore, the object of serious criticisms from car manufacturers.

STATE OF THE ART

It has been attempted by various means to remedy the clearances caused by the manufacturing tolerances and the wear of the toothings of these epicycloidal train articulations. However, the solutions proposed till now are in general costly and do not always afford the complete result desired. Further, they are delicate to mount, which makes practically impossible the mounting of such articulations on automatic machines, thereby increasing the cost price of the seat, which is an unacceptable result for the manufacturers. In this respect, U.S. Pat. No. 4,371,207 to Wilking et al shows precisely an embodiment that the present invention tends to improve.

It is therefore an object of the present invention to provide a special cam supporting the satellite, which can allow, due to its simple design and mounting ease, an automatic and permanent take up of the clearances of the above mentioned continuous epicycloidal train articulations.

Moreover, the present invention brings about, due to a design of some of its members, a substantial improvement for the automatic mounting of these articulations and ensures therefore a reduction of the cost price when manufacturing same.

SUMMARY OF THE INVENTION

The invention concerns, in a clearance take up device for so-called continuous epicycloidal train articulation, with an inner toothing of a fixed flange and an inner toothing of a mobile flange cooperating with a double satellite that is mounted in ball bearing means that forms a housing for a composite cam therein, the improvement wherein:

an intermediate circular part is mounted in bearing means of said fixed and mobile flanges; and said composite cam compresses two symmetrical and identical parts as half-cams, whereby right from the outset, sufficient offsetting exists between a diameter of toothings of said double satellite and said intermediate part, which is concentric to said toothings of said fixed and mobile flanges, so as to allow said half-cams to be normally separated from one another at an upper portion thereof by a spring that is slightly under tension and at a lower portion thereof by a finger that is rigidly connected to said intermediate part, and so that, to overcome a hard pint that is produced during rotation of said satellite and is due to an ovaling of said toothings of said flanges and said satellite inherent to the manufacture thereof, said upper portions of said half-cams, under an impulse of said finger, come into contact with one another, accompanied by compression of said spring, to thereby create a decrease of said offsetting of said toothings of said satellite relative to said toothings of said flanges and provide for passage over said hard point, whereby as soon as said hard point is passed, said compressed spring returns said half-cams to their separated position and returns said finger of said intermediate part According to another feature of the invention, the upper portion of the half-cams are provided with respective recesses to accommodate the spring for separating same, causing a separation of the heels or end portions of the half-cams.

According to still another feature of the invention, the invention relates to a method for making the device of claim 7, whereupon to obtain minimum offsetting of said ball bearing means relative to cylindrical portions of said intermediate part, an automatic mounting in a detached station of said satellite, said half-cams, said spring, said ball bearing means, and finally said intermediate part is effected, whereupon the aforementioned components are placed in said mobile flange to thereby form in this portion a clearance for said satellite in said toothing of said mobile flange, whereupon said fixed flange is then automatically placed upon said components and is centered via a portion of said intermediate part disposed about a cylindrical axis thereof, whereupon an automatic mechanism pushes said intermediate part such that under the action of release of said spring, there is an increase of said offsetting up to a value chosen to obtain penetration of said toothings of said satellite into said toothings of said fixed and mobile flanges.

Various other features of the invention will become more apparent from the following detailed description.

BRIEF DESCRIPTION OF THE DRAWINGS

An embodiment of the object of the invention is shown by way of a non limiting example in the accompanying drawings.

FIG. 6 is a diametrical cross sectional view corresponding to FIG. 5 but shows the mechanism in a normal operative position, the intermediate central part being in its position in the fixed and mobile flanges.

FIGS. 6a and 6b respectively correspond to FIGS. 5a and 5b but the intermediate central part is shown pushed back in its final position.

DESCRIPTION OF AN EMBODIMENT OF THE INVENTION

Figure 1:
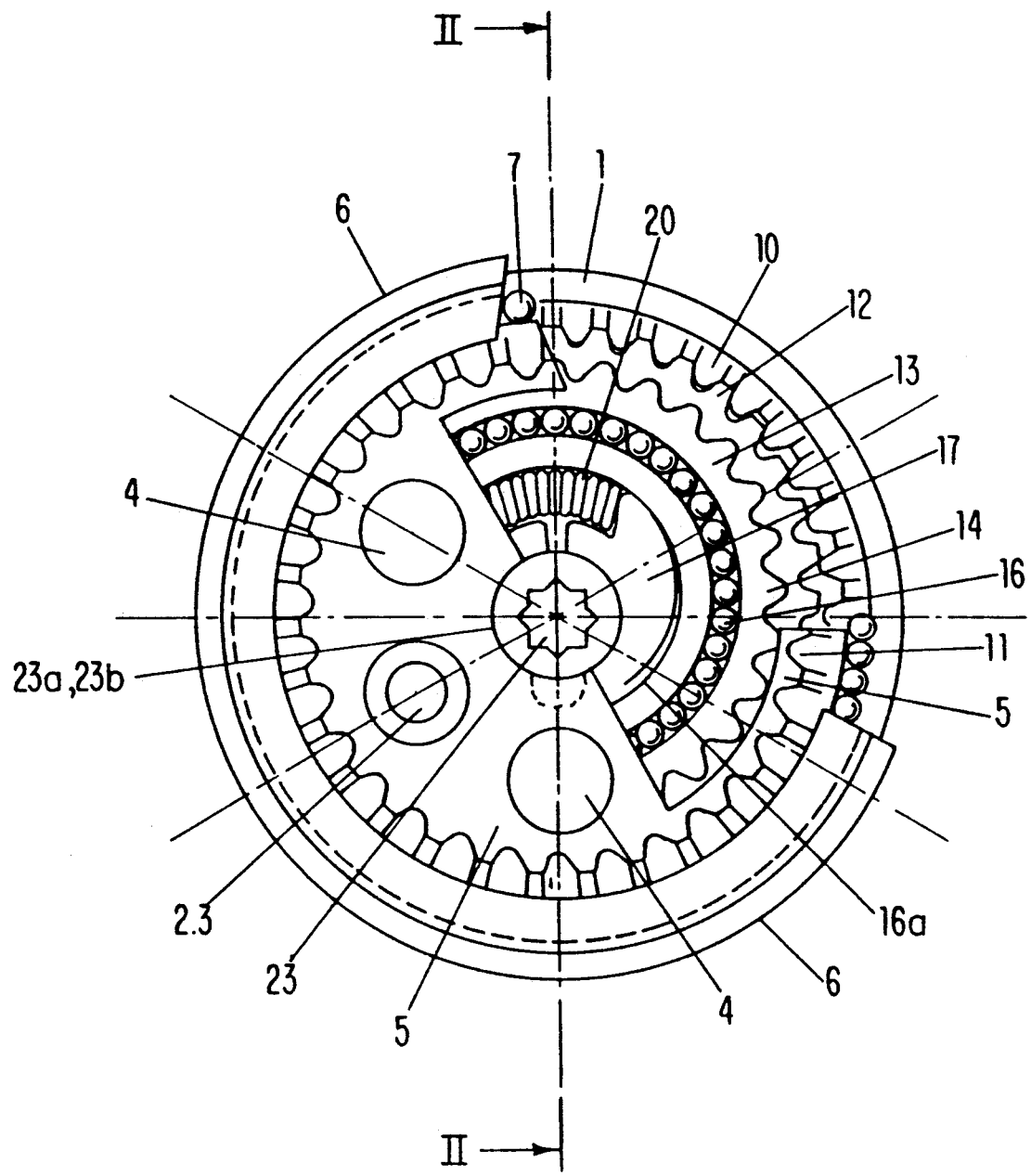
FIG. 1 is a partly cut out, front view of a so-called continuous epicycloidal train articulation provided with the clearance take up device of this invention.

As shown in FIG. 1, the so-called continuous epicycloidal train articulation which is illustrated comprises a fixed flange 1 carrying on its outer face known per se, fixation members 2, 3 which are normally three in number and are distributed at 120° relative to one another. In intermediate positions, centering pins 4 are provided that these pins 4 are also placed at 120° with respect to one another and at 60° from the fixation members 2, 3.

The mobile flange 5 includes also fixation members 2, 3 and pins 4 which are distributed on a circle having a diameter which is slightly less than the diameter determined by the fixation members 2, 3 and the pins 4 of the fixed flange 1.

Finally, the mobile flange 5 is retained on the fixed flange 1 by a crimped ring 6. A ball bearing 7 is interposed between the crimped ring 6 and an outer ring of the mobile flange 5 in order to facilitate the rotation of the mobile flange 5 with respect to the fixed flange 1 and ring 6.

It should be noted, that the mobile flange 5 is centered on the fixed flange 1 in a known manner by means of a circular groove 8 (FIG. 2) formed on a free periphery of the fixed flange 1. As well shown in FIG. 1, the fixed flange 1 includes inside an inner peripheral toothing 10 while the mobile flange 5 has an inner toothing 11.

In the present case and since the fixed flange 1 has the same diameter as the mobile flange 5, the toothings 10 and 11 have a different tooth module. In some cases however, the tooth module can be the same for the two flanges, with the number of teeth different by at least one tooth between toothing 10 and toothing 11.

Figure 2:
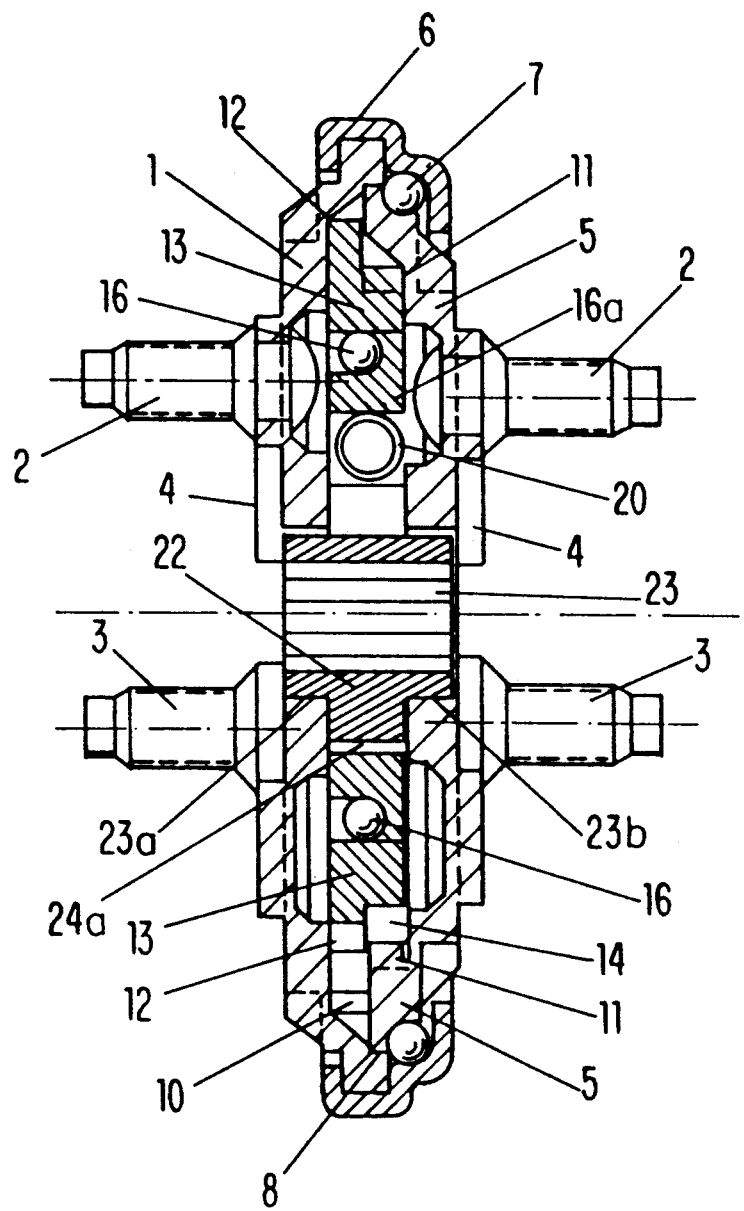
FIG. 2 is a cross sectional view along line II—II of FIG. 1.

As illustrated in FIGS. 1 and 2, the fixed toothing 10 meshes with the toothing 14 of the satellite 13 meshes with the toothing 11 of the mobile flange 5. The double satellite 13 is mounted on a ball bearing 16 which can be a cage ball bearing. The ball bearing 16 is used as a bearing for the double satellite 13, and in the present case, cage 16a of the ball bearing 16 is recessed inside so as to receive a composite cam 17 made of two half-cams 18, 19 (FIG. 3) each having, in their upper portion, a clearance hole 18a, 19a for containing a spring 20 (see FIGS. 1, 2, 3 and 4). Therefore, the spring 20 normally repels the two half-cams 18, 19 in the position shown in FIG. 4. It should be pointed out that the composite cam 17 is mounted on an intermediate circular part 22 centered in bearings 23a, 23b formed in the flanges 1 and 5.

In the present case, the intermediate circular part 22 receives a control member (not shown) for a powered device, extending through a polygonal hole 23 in the intermediate circular part 22.

Finally, the intermediate part 22 is formed on its rim with a finger 24 placed between the terminal ends 18b, 19b of the half-cams 18, 19 forming the composite cam 17.

Figure 4:
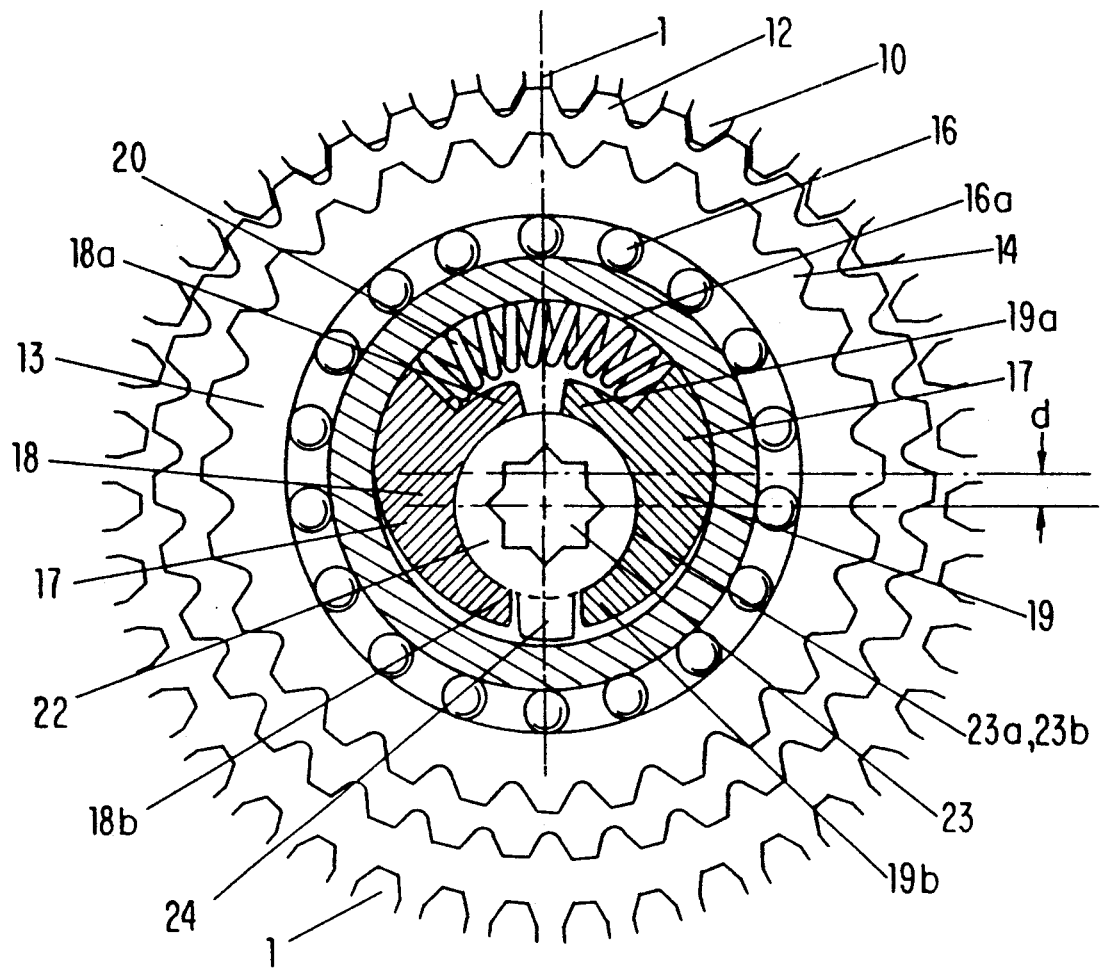
FIG. 4 is a view similar to FIG. 3 but with the clearance take up device in other position.

In the case of FIG. 4, the finger 24 is not normally in contact with the parts 18, 19.

Figure 3:
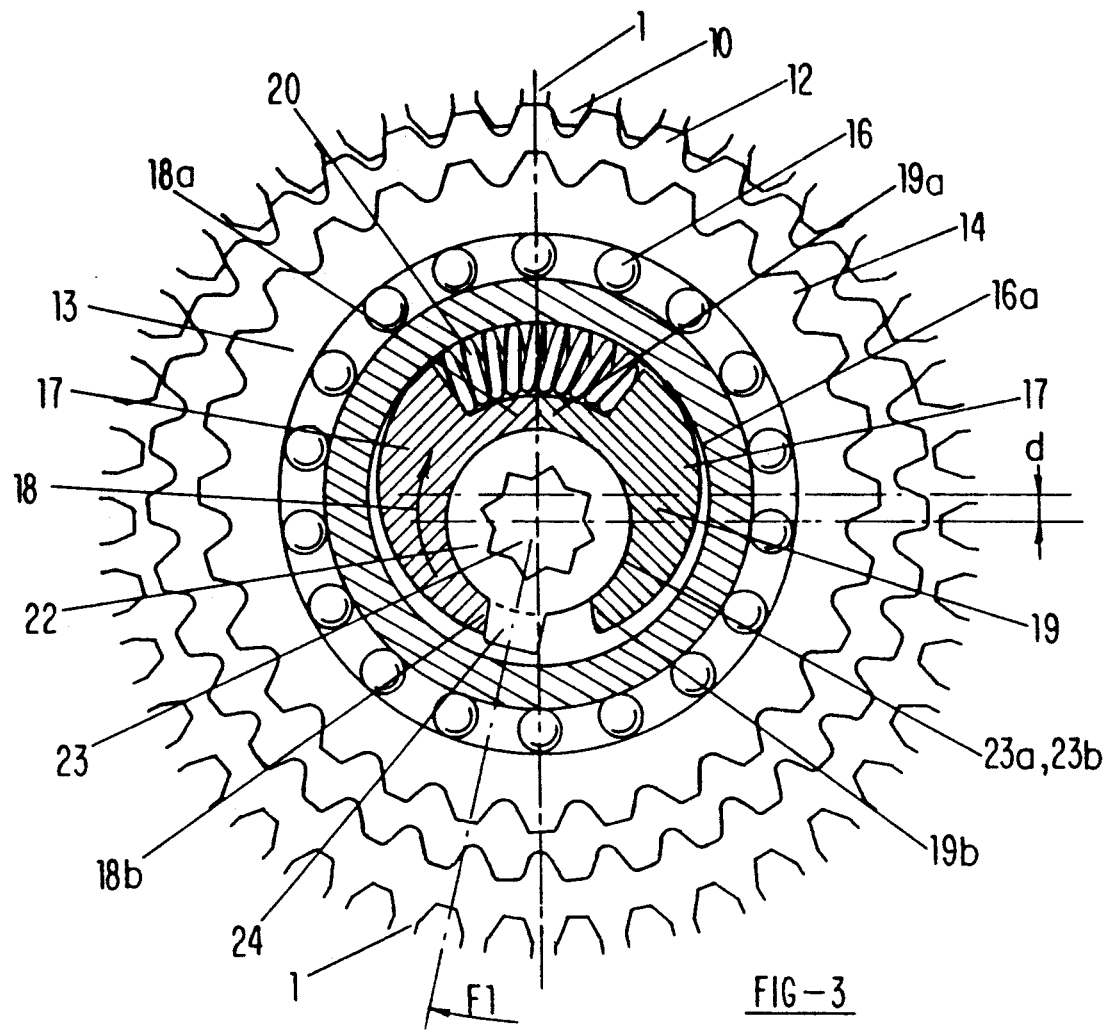
FIG. 3 is an enlarged partial schematic view showing the clearance take up device when in the epicycloidal train articulation.

As may be understood in particular from FIGS. 3 and 4, the control member extending through the hole 23 (creating the rotary movement either with the assistance of a control button mounted on one of its ends, or with the assistance of a pneumatic, electrical or other motor) is eccentric by a distance d with respect to the axis of the toothings of the double satellite 13.

Figure 4A:
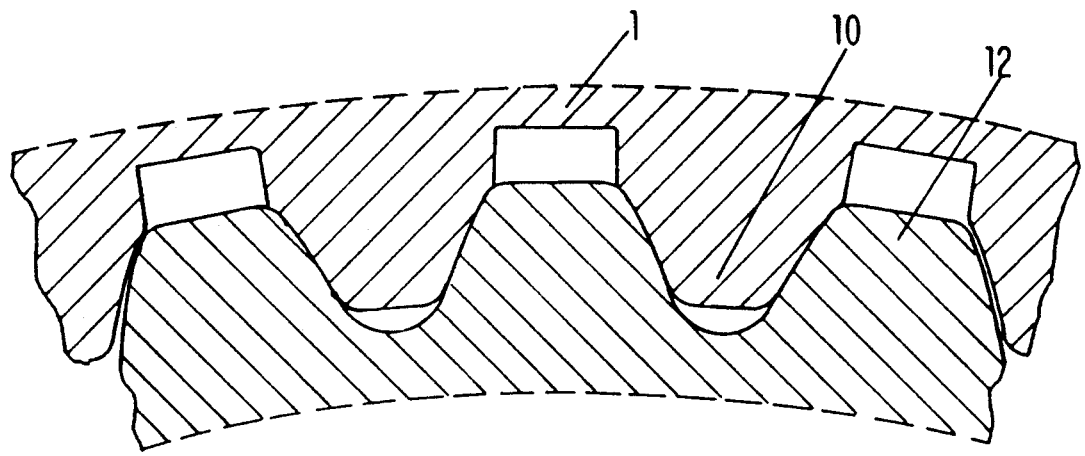
FIG. 4a is a very enlarged view showing the portion of the toothings included in a circle in FIG. 4.

The realization of the so-called continuous epicycloidal train articulation parts generates necessarily, during manufacture, an "ovaling" (i.e., irregular oval shape) of the double satellite and of the flanges and, therefore, hard points (see FIG. 4a) will be observed when driving the control member.

Figure 3A:
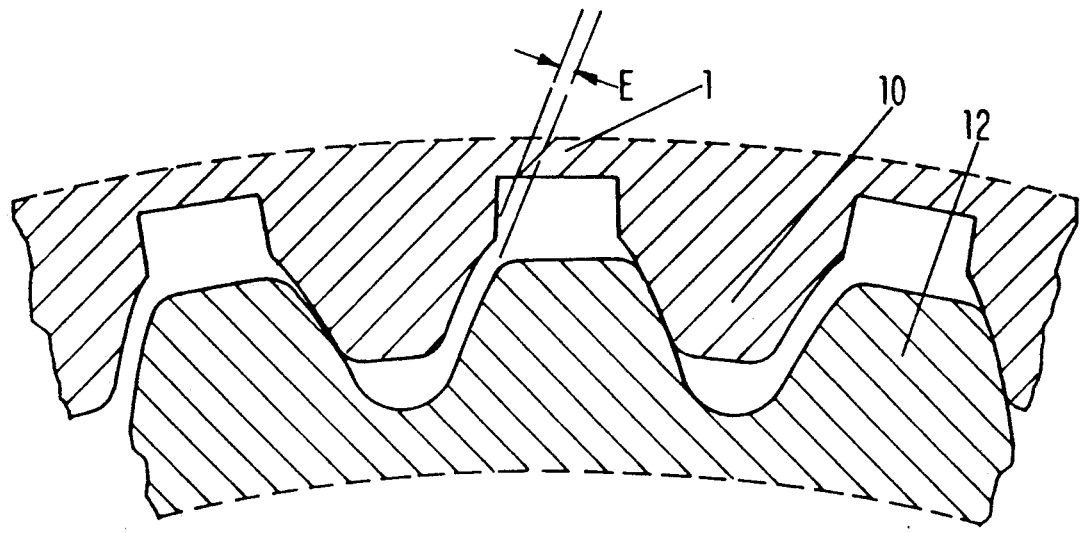
FIG. 3a is a very enlarged view showing the portion of the toothings included in a circle in FIG. 3.

Driving the control member creates a rotation of the double satellite 13 with respect to the inner toothings 10, 11 of the fixed and mobile flanges 1, 5. Due to the above ovaling a hard point is rapidly reached and, since the intermediate part 22 continues to rotate, the finger 24 moves toward the left (arrow $f_1$, FIG. 3), and pushes the part 18 until the moment when, acting against spring 20, the top terminal end or heel 18a of part 18 meets the high terminal portion or heel 19a of part 19. This causes a slight modification (reduction) of the primary eccentricity. This causes, due to a backward movement of the double satellite 13, a disengagement of the toothings (side E, see FIG. 3a) of the fixed and mobile flanges 10 and 11. The hard point in consideration is therefore passed over and, as soon as the pressure has been reduced, the parts 18, 19 forming the composite cam 1 are set back into the position shown in FIGS. 4 and 4a under impulse of the spring 20 which is slightly released.

Finger 24 is again centered and spring 20 is slightly decompressed. This movement causes also a return to the normal eccentricity, that is the position shown in FIG. 4.

All the clearances caused by the manufacturing tolerances and even by the wear of all the toothings, that is of the toothings of the flanges as well as the toothings of the double satellite, are taken up. Therefore, a continuous rotation of the epicycloidal train articulation can proceed without any clearance which could be transmitted either to the seat back or to the rising members of the seating portion of the seat in consideration according to whether these articulations are used on the seat back or on the seating portion.

Since this device is simple to make and easy to mount, it can be manufactured without using a special manufacturing method or surface treatment. The manufacturing cost of the above so-called continuous epicycloidal train articulations is then reduced.

Figure 5A:
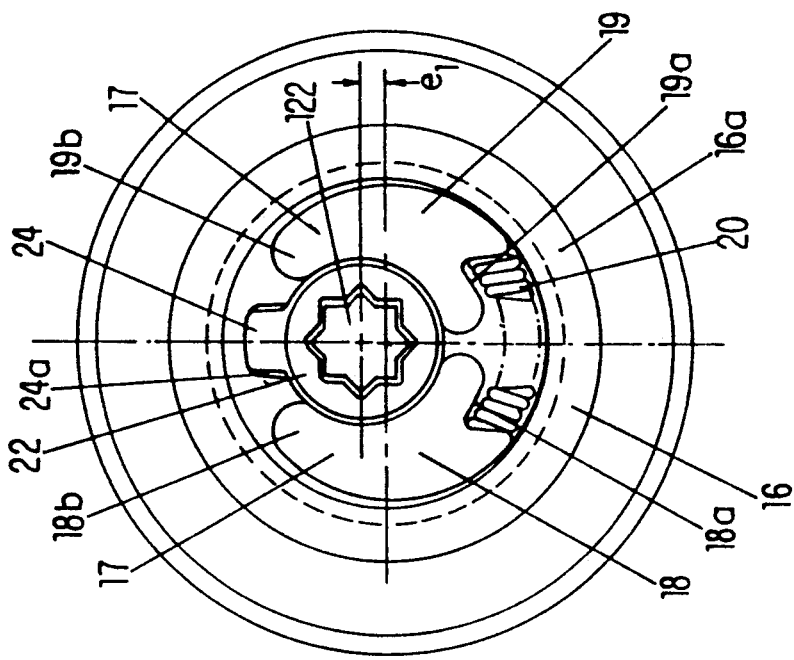
FIG. 5a is a partial plan view of one side of the central portion of the articulation and shows the satellite, the composite cam, the spring placed at one of the ends of the composite cam, the intermediate part and the control finger for the composite cam.
Figure 5:
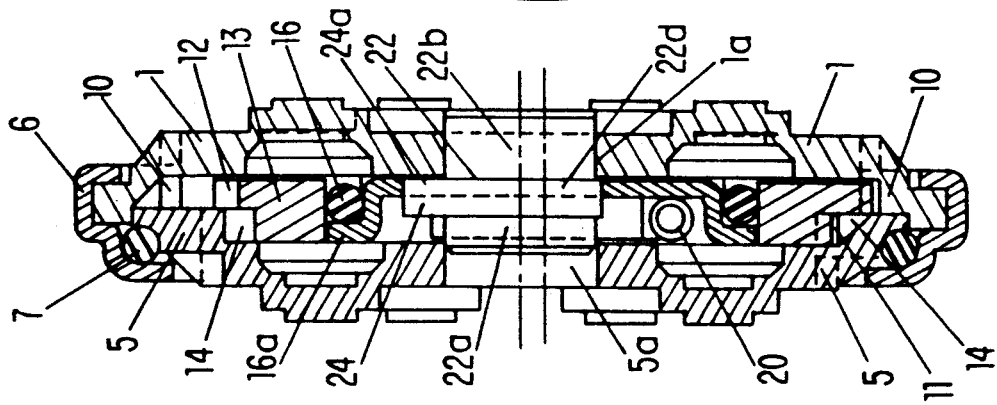
FIG. 5 is a diametrical cross sectional view of the articulation while being mounted.

In FIG. 5, the articulation mechanism is identical to that described in FIGS. 1 to 4a and comprises therefore a fixed flange 1 which is to be mounted on the armature of the seating portion of a seat, and a mobile flange 5 which is to be mounted on the armature of the back of the same seat. The fixed 1 and mobile 5 flanges are retained one against the other by a crimped ring 6 forming inside a ball race 7.

The double satellite 13 includes a toothing 12 meshing with the toothing 10 of the fixed flange 1, while the toothing 14 of the satellite 13 meshes with the toothing 11 of the mobile flange 5. The double satellite 13 is mounted in a ball bearing 16 the cage 16a of which is centered against an inner face of the fixed flange 1.

As may be seen in the drawings, the cam 17, called composite cam, is made of two half-cams 18, 19 having each, in their lower portion, a clearance hole 18a, 19a for containing a spring 20 tending to push them one toward the other.

Finally, an intermediate circular part 22 which will be described later can be engaged in the recessed central portions 5a of the mobile flange 5 and 1a of the fixed flange 1.

The intermediate circular part 22 is formed in its center with a channel 122 in the shape of a star with eight branches for receiving a control bar for driving the articulation device, this control bar being itself either or powered driven manually or through a motor.

Finally, the intermediate control part 22 is formed on its rim with a finger 24 which is engaged between the terminal ends 18b, 19b of the half-cams 18, 19 forming the composite cam 17.

The intermediate circular part 22 comprises a circular central portion 22d carrying the finger 24 and which is extended on the side of the fixed flange 1, by a cylindrical element 22b of great length, and on the side of the mobile flange 5 by a cylindrical portion 22a which is shorter.

When assembling by an automatic machine the following set of parts : half-cams 18, 19 forming the cam 17, spring 20, intermediate circular part 22, satellite 13, ball cage 16a, balls 16, this set of parts is directly mounted on the mobile flange 5 and then covered by the fixed flange 1 prior to crimping the ring 6 containing the balls of ball bearing 7.

Figure 5B:
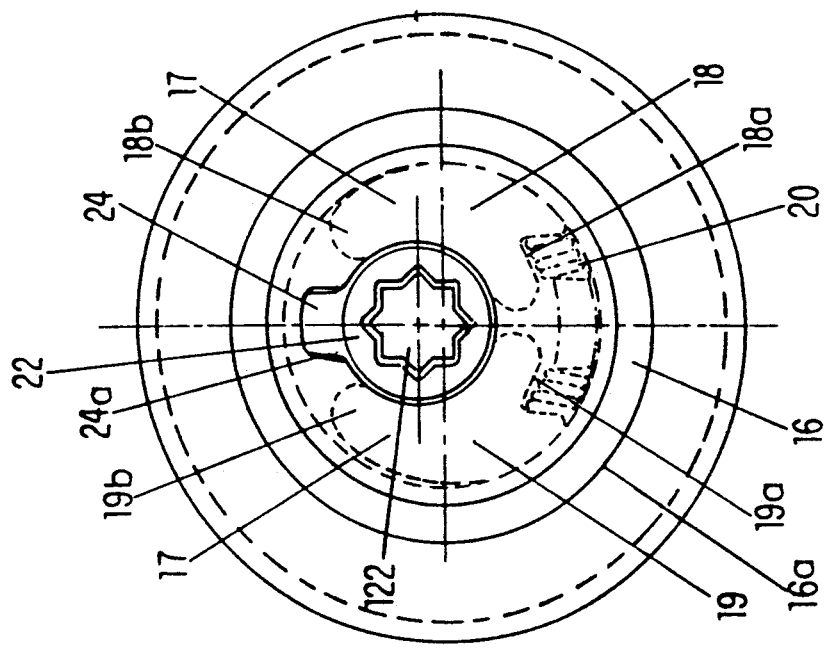
FIG. 5b shows the other side of the central portion of the mechanism, and discloses the satellite, the composite cam, the spring, the intermediate central part and its control finger.

As shown in the drawings, the finger 24 is first mounted so as to engage a notch 24a (FIGS. 5, 5a, 5b) provided in the cage 16a of the ball bearing 16.

Thus, the parts will occupy the position shown in FIG. 5, meaning that the satellite 13 bears on the central portion of the housing formed by the inner faces of the fixed 1 and mobile 5 flanges and that the spring 20 is compressed since the half-cams 18, 19 are in a lower position and remote from finger 24. The eccentricity $e_1$ (FIG. 5a) is minimum and therefore the toothings 12 and 14 of the double satellite 13 are just slightly in mesh with the toothings 10 and 11 of the fixed and mobile flanges 1 and 5. But at that moment the intermediate circular part 22 is not in a working position (see FIG. 5), and the parts can be easily and automatically put in position.

When the crimping ring 6 is in position, the only thing to do is then to push back the intermediate circular part 22 toward the mobile flange 5 (see FIG. 6). The intermediate circular part 22 thus occupies its normal position and, by displacing the central portion 22d of the intermediate circular part 22, the half-cams 18, 19 forming the cam 17 are put in position (see the position of these half-cams in FIG. 6), thereby causing the decompression of spring 20. Therefore, the double satellite 13 is correctly put in position, its toothings 12, 14 extending into the inner toothings 10, 11 of the fixed 1 and mobile 5 flanges (see FIG. 6).

The mechanism is then in a perfect operational position and the eccentricity $e_1$ (see FIG. 6) is greater than $e_2$ as explained heretobefore for FIGS. 1 to 4a.

We claim:

1. A clearance take up device for a so-called continuous epicycloidal train articulation, comprising:

a fixed flange having an inner toothing and a mobile flange having an inner toothing, each of said fixed and said mobile flanges having a bearing means;

means for receiving a control member;

an intermediate circular part mounted on said control member and positioned in said bearing means of said fixed and mobile flanges so as to be concentric to said toothings of said fixed and said mobile flanges;

a ball bearing in a bearing cage enclosing said intermediate circular part;

a double satellite mounted on said ball bearing cage, said double satellite having two outer toothings cooperating with said inner toothings of said fixed and said mobile flanges;

said intermediate part being comprised of a central portion disposed in said ball bearing cage, a first extension disposed in said bearing means of said mobile flange, and a second extension disposed in said bearing means of said fixed flange, and further having a radially extending finger;

a composite cam inserted between said ball bearing cage and said intermediate circular part, said composite cam comprising two symmetrical and identical parts as half-cams, wherein said ball bearing cage of said ball bearing has a recess for receiving said composite cam and a notch for receiving said finger of said intermediate circular part;

a spring that is slightly under tension positioned between upper portions of said half-cams and with said finger positioned between lower portions of said half-cams, with sufficient eccentricity existing between a diameter of toothings of said double satellite and said intermediate part so as to separate said half-cams from one another at an upper portion thereof by said spring and at a lower portion thereof by said finger; and wherein for overcoming a hard point that is produced during rotation of said double satellite due to an ovaling of said toothings of said flanges and said double satellite inherent to the manufacture thereof, said upper portions of said half-cams, under an impulse of said finger, are forced against one another, accompanied by compression of said spring, to thereby decrease said eccentricity of said toothings of said double satellite relative to said toothings of said flanges and provide for passage over said hard point, and wherein, as soon as said hard point is passed, said compressed spring returns said half-cams to their separated position and also returns said finger between said lower portions of said half-cams.

2. A device according to claim 1, in which said upper portions of said half-cams are provided with respective recesses to accommodate said spring for separating same.

3. A device according to claim 1, in which said intermediate part is provided with a hole of polygonal section for receiving a control or power means to provide rotation of said intermediate part and said finger thereof to ensure rotation of said satellite by reaction of said half-cams and said flanges in rotation relative to one another.

4. A device according to claim 1, wherein said first extension is shorter than said second extension.

* * * * *

UNITED STATES PATENT AND TRADEMARK OFFICE
CERTIFICATE OF CORRECTION

PATENT NO. : 5,277,672

DATED      : January 11, 1994

INVENTOR(S): Droulon et al

It is certified that error appears in the above-identified patent and that said Letters Patent is hereby corrected as shown below:

On the title page:

[75]   Inventors:   Georges Droulon; Yann Reubeuze,
                    both of Flers, France Signed and Sealed this Twenty-fourth Day of May, 1994

Attest:

BRUCE LEHMAN

*Attesting Officer*    *Commissioner of Patents and Trademarks*